3,496,124
HIGH IMPACT FOAM BLEND OF TWO DIFFERENT POLYETHYLENES
Donald G. Needham and Roy L. Bodkins, Bartlesville, Okla., assignors to Phillips Petroleum Company, a corporation of Delaware
No Drawing. Filed Apr. 13, 1967, Ser. No. 630,522
Int. Cl. C08f *47/10, 29/04*
U.S. Cl. 260—2.5           6 Claims

ABSTRACT OF THE DISCLOSURE

Foamed polymeric compositions having high impact resistance are produced by foaming a blend of relatively low density, broad molecular weight distribution polyethylene, relatively high density, narrow molecular weight distribution polyethylene and a selected amount of foaming agent.

---

Several properties of foamable thermoplastic compositions are of considerable importance in many of their applications. For example, it is often desirable that foamed thermoplastic articles possess relatively uniform cell structure as well as sufficient tensile strength, resilience, implication. We have found that several desirable properties of such foamable compositions and foamed article produced therefrom can be improved by employing a particular thermoplastic composition and selected amounts of several polymers and foaming agent.

In the past, various blends of polyethylene have been formulated to produce compositions having improved physical charactistics. For example, a polyethylene blend having improved properties is prepared from low density polyethylene and cracked highly crystalline high density polyethylene as disclosed in U.S. Patent 3,086,-958. Low density polyethylene has been blended with visbroken high density polyethylene to produce compositions having improved processability and permeability as disclosed in U.S. Patent 3,247,290. Stress cracking properties of high molecular weight high density polyethylene are improved by blending them with a minor amount of low molecular weight low density polyethylene as disclosed in U.S. Patent 3,183,283.

We have now discovered that foamed polymer compositions having greatly improved combination of desired properties can be produced from blends of low density polyethylene as produced, "particle form" high density polyethylene as produced and a blowing agent. "Particle form" high density polyethylenes are made according to U. S. Patent No. 2,825,721 and British Patent No. 853,-414.

It is therefore one object of this inevntion to provide a foamed structurally stable thermoplastic composition having improved physical properties. It is another object of this invention to provide foamed compositions having uniform cell structure and improved impact resistance. It is yet another object of this invention to provide an improved foamable composition for producing structurally stable foamed thermoplastic articles having uniform cell structure and improved physical properties.

In accordance with one embodiment of this invention, foamed polyethylene articles having improved physical properties are produced from foamable compositions comprising blends of low density polyethylene, high density polyethylene, high density polyethylene and a foaming agent.

The low density polymers usually have densities within the range from about 0.89 to about 0.93. However, polymers having densities of about 0.91 to about 0.93 are presently preferred. Within the concept of this invention, these polymers can be employed in the foamable compositions as produced in which case they usually possess melt index values within the range of from about 11 to about 13. The molecular weight distributions of these low density polymers are usually relatively broad as represented by MI/CIL ratios in excess of 1.2:1. These ratios are as determined by ASTM Standard B1238–62T melt index analysis and Canadian Industries Limited Standard (CIL) values.

Although essentially any polyethylene polymers having the described properties can be used effectively within the concept of this invention, it is presently preferred to employ the low density polymers produced by the well known high pressure polymerization process without substantial physical modification.

The high density polyethylenes usually have densities within the range of from about 0.94 to about 0.97 and melt index values within the range of from about 0.1 to about 1.0 as determined by ASTM Standard B1238–62T. The molecular weight distributions of these polymers are usually more narrow than those of the above-described low density polymers as represented by MI/CIL ratios of less than 1.2:1, preferably within the range of from about 0.8:1 to about 1.2:1.

High density polyethylene having these desired properties can be produced by the process described in U.S. Patent No. 2,825,721, although polymers having the desired properties yet produced by other processes can also be employed within the concept of this invention.

Foaming agents which can be employed in this invention are essentially any of those which can be activated within the operating temperatures desired during the molding step. Although molding temperatures can vary considerably, depending upon the polymers employed, the preferred operating ranges associated with the preferred polymers is usually from about 325 to about 500° F. For example, carbonates and bicarbonates of sodium, potassium, ammonium, oxalates of sodium and calcium, sodium formate, diazo compounds such as amino-diazo-benzene, azobisformamide, azobisisobutyronitrile and numerous others are adequate for this purpose. At present, azobisformamide, marketed as Celogen AZ by Naugatuck Chemical Corp., is the preferred blowing agent.

In some applications it is desirable that a dispersing agent also be used. Numerous dispersants can be employed, as their particular characteristics are not necessarily essential to the concept of this invention. Suitable dispersants are, for example, relatively low molecular weight polyisobutylene, mineral oil, dibutyl phthalate, polyethylene glycols, butyl stearate and numerous others well known in the art. Polyisobutylene haveing a molecular weight within the range of from about 600 to about 1200 is presently preferred and can be employed in concentrations within the range of from about 0.05 to about 0.1 weight percent based on polymer.

Numerous fillers, pigments, lubricants, antioxidants, etc. well known in the art can also be incorporated into these compositions as desired.

The foamed compositions of this invention having improved physical properties are prepared from blends comprising from about 65 to about 80 parts by weight low density polyethylene and from about 35 to about 20 parts by weight high density polyethylene. These polymers can be blended by any means sufficient to produce a relatively homogeneous blend such as, for example, blending in a drum blender or on a Banbury Mixer or extruder blending and pelletizing. Foaming agent concentration is determined by the degree of foaming desired and the necessary characteristics of the resultant foam structure required to give the improved impact resistance. Foaming agent concentrations within the range of from about 0.75 to about 1.1 achieve these purposes and are presently preferred.

The concept of this invention is illustrated by the following examples.

Several blends having varying amounts of high density (.954) and low density (.915) polyethylenes and Celogen AZ (asobisformamide) were blended in a Rainco Model 101 drum blender operated at 50 r.p.m.'s and at ambient temperature for a period of 10 minutes to produce homogeneous blends thereof and were injection molded into foamed buckets. The impact resistance, flexural modulus and tensile strength (MD and TD) of the foamed articles were determined by the methods defined by ASTM Standards D790–63, D638–61T, and D256–56, respectively. Rim stiffness values were determined with a standard "Instron" machine and a 10%6 inch rim diameter, 9¼ inch high bucket having a wall thickness of 160 mils. Rim stiffness is reported as the pounds force required to compress the rim one inch at a ratio of two inches per minute. The results are illustrated in the following table.

| | Blend ratio, HD/LDPE | Blowing agent, percent | Impact, ft./lbs. | Rim stiffness, lbs. | Flexural modulus | Tensile strength | |
|---|---|---|---|---|---|---|---|
| | | | | | | MD [1] | TD [2] |
| Blend No.: | | | | | | | |
| 1 | 0/100 | 1.00 | 88 | 1.5 | 15,000 | 925 | 640 |
| 2 | 25/75 | None | 88 | 4.9 | 41,000 | 1,600 | 1,600 |
| 3 | 20/80 | 0.75 | 60 | 3.6 | 34,000 | 950 | 1,050 |
| 4 | 25/75 | 0.75 | 42 | 4.1 | 42,000 | 1,100 | 1,150 |
| 5 | 25/75 | 1.00 | 24.4 | 4.0 | 33,000 | 1,100 | 812 |
| 6 | 30/70 | 1.00 | 27.2 | 5.0 | 46,000 | 1,350 | 1,100 |
| 7 | 35/65 | 1.00 | 16 | 5.4 | 51,000 | 1,400 | 1,250 |
| 8 | 40/60 | 1.25 | 5.3 | 6.2 | 60,000 | 1,600 | 1,300 |

[1] MD, Machine direction.
[2] TD, Transverse direction.

From these data, it is apparent that concentrations of either foaming agent or high density polyethylene above the prescribed levels result in considerable reduction of impact resistance, lower tensile strengths and overall undesirable property profile. Blend No. 1 of foamed low density polyethylene resulted in a soft semi-resilient article having a rim stiffness of only 1.5 lbs. and a flexural modulus of only 15,000. Although this material might be suitable for the production of sponge or articles having similar characteristics, it is not considered suitable, due to the nature of the structural qualities mentioned, for application in the production of buckets, coat hangers, glasses, etc. require considerably higher structural stability. Blend No. 2 of unfoamed polyethylene constituted relative proportions of high and low density polymer within the preferred range for the foamed blends. Articles produced from this blend evidenced a suitable property profile but are quite heavy having densities of 0.922 (gram per cc.). Blends 3, 4, 5 and 6 are the most desirable of those illustrated in the table in that they not only possess the desired structural qualities but have considerably reduced density of 0.645 gram per cc. Blend 7 is considered to be of marginal value due to the resulting decrease in impact strength and Blend No. 8 is considered unsuitable in these applications due to the lack of resilience and the relatively high brittleness found in these articles as evidenced by high flexural modulus and high rim stiffness. The impact resistance of this latter blend is also substantially below the desired levels.

We claim:

1. A foamable injection moldable composition for producing structurally stable foamed articles having an improved property profile comprising a blend of from about 65 to about 80 parts by weight of a relatively low density broad molecular weight distribution polyethylene, from about 35 to about 20 parts of relatively high density narrow molecular weight distribution polyethylene, and from about 0.75 to about 1.1 weight percent foaming agent based on said polyethylene, said low density polyethylene having a density within the range of 0.89–0.93 and an MI/CIL (molecular weight distribution) ratio in excess of 1.2:1, and said high density polyethylene having a density within the range 0.94–0.97, and an MI/CIL (molecular weight distribution) ratio less than 1.2:1.

2. The composition of claim 1 wherein said low density polyethylene has a density within the range of from about 0.91 to about 0.93 and a melt index within the range 11–13, and said high density polyethylene has a melt index within the range 0.1–1.0.

3. The composition of claim 1 wherein said low density polyethylene has an MI/CIL ratio within the range of from about 1.5 to about 2.5:1 and said high density polyethylene has an MI/CIL ratio within the range of from about 0.8 to about 1.2:1.

4. The composition of claim 1 wherein said foaming agent is decomposable at a temperature within the range of from about 325 to about 475° F.

5. A foamed article produced by heating the composition of claim 1 at a temperature sufficient to decompose said foaming agent.

6. A foamed injection molded article produced by heating the composition of claim 3 at a temperature sufficient to decompose said foaming agent.

References Cited

UNITED STATES PATENTS 3,098,831  7/1963  Carr _____ 260—2.5

MURRAY TILLMAN, Primary Examiner

MORTON FOELAK, Assistant Examiner

U.S. Cl. X.R.

260—31.2, 31.8, 33.2, 33.6, 897